United States Patent [19]

Agou et al.

[11] Patent Number: 4,957,985

[45] Date of Patent: Sep. 18, 1990

[54] FLUORINE-SUBSTITUTED HYDROCARBON GROUP GRAFTED (METH)ACRYLATE POLYMERS

[75] Inventors: Tokinori Agou, Ohno; Takeshi Sakashita, Iwakuni; Tomoaki Shimoda, Waki; Masaru Sudo, Ohtake; Masahiro Kuwabara, Waki; Masahide Tanaka, Iwakuni, all of Japan

[73] Assignee: Mitsui Petrochemical Industries, Ltd., Tokyo, Japan

[21] Appl. No.: 138,653

[22] Filed: Dec. 29, 1987

[30] Foreign Application Priority Data

May 18, 1987 [JP] Japan .................................. 62-118956
Dec. 29, 1987 [JP] Japan .................................. 61-312934

[51] Int. Cl.$^5$ .................. C08F 265/04; C08F 120/28; C08F 220/28
[52] U.S. Cl. .................................. 526/246; 523/106; 525/276

[58] Field of Search .................. 525/276; 523/106

[56] References Cited

U.S. PATENT DOCUMENTS

| 4,216,303 | 8/1980 | Novicky ................. 528/32 |
| 4,486,577 | 12/1984 | Moeller et al. ....... 525/479 |
| 4,511,209 | 4/1985 | Shutnik .................. 522/172 |
| 4,666,991 | 5/1987 | Matsui et al. .......... 525/276 |

*Primary Examiner*—John C. Bleutge
*Assistant Examiner*—Robert E. L. Sellers, II
*Attorney, Agent, or Firm*—Sherman and Shalloway

[57] ABSTRACT

Hydrophilic gelled crosslinked polymers comprising as an essential constituent monomer component a (meth)acrylate ester monomer having a fluorine-substituted hydrocarbon group containing at least three fluorine atoms grafted thereto. The fluorine-containing polymers have excellent oxygen permeability, water swellability, wearing comfort and contamination resistance.

12 Claims, 1 Drawing Sheet

FLUORINE-SUBSTITUTED HYDROCARBON GROUP GRAFTED (METH)ACRYLATE POLYMERS

BACKGROUND OF THE INVENTION

1. Field of the Invention

This invention relates to fluorine-containing polymers having excellent oxygen permeability, water swellability and contamination resistance and oxygen-permeable articles formed from the polymers. More specifically, this invention relates to oxygen-permeable articles which when used for medical or other purposes, for example as soft contact lenses, exhibit excellent properties such as bio-compatibility and can be worn for an extended period of time.

2. Description of the Prior Art

The cornea of the eye is an avascular tissue. Oxygen required for its aerobic metabolism is supplied by diffusion from the eyelid conjunction or aqueous humor during sleeping, but taken from the atmosphere during awaking. Accordingly, wearing of a contact lens, whether a soft or hard one, is liable to be an obstacle to oxygen supply. Wearing of the contact lens for an extended period of time often results in bloodshot eyes, edema, and other corneal disorders. Hence, a material for contact lenses is required to have excellent oxygen permeability in addition to excellent optical, chemical, physical and mechanical properties. Furthermore, contact lenses are required to have resistance to contamination by proteins, lipids and mucin which are the components of tear and to bacteria and eumycetes as well, excellent hydrophilicity, excellent water swellability, excellent wearing comfort and excellent bio-compatibility.

Polymethyl methacrylate (PMMA) and polymers of other various methacrylate ester monomers have been widely used as materials for contact lenses. Most of them have low oxygen permeability and cannot withstand wearing for an extended period of time.

To improve the oxygen permeability of conventional methacrylate ester polymers, there have been proposed, for example, a silicone methacrylate polymer having a siloxane linkage introduced into methacrylate ester molecules (Japanese Patent Publication No. 33502/1977), and an oxygen-permeable polymer composed mainly of cellulose acetate butyrate and a fluorine-containing methacrylate polymer (Japanese Laid-Open Patent Publications Nos. 51705/1982 and 111308/1986) as materials for contact lenses. These polymers have improved oxygen permeability over conventional methacrylate ester polymers such as PMMA, but their oxygen permeability is still not sufficient. Hence, polymers having still improved oxygen permeability have been desired. These conventional improved polymers, moreover, do not have satisfactory contamination resistance, hydrophilicity, water swellability and wearing feel.

SUMMARY OF THE INVENTION

With the foregoing background, the present inventors have made extensive investigations in order to develop an oxygen-permeable article having excellent oxygen permeability, hydrophilicity, water swellability and contamination resistance, and have now found that specific fluorine polymers meets the above objective.

The fluorine-containing polymers of this invention can be classified into two types.

One type of polymer comprises a fluorine-containing (meth)acrylate monomer composed of a (meth)acrylate ester monomer represented by the general formula (I)

or the general formula (II)

wherein $R^1$, $R^2$ and $R^3$ each represent a hydrogen atom or a methyl group, $R^4$ represents a hydrocarbon group having 1 to 30 carbon atoms which may have an oxygen or fluorine atom, and m and n each represent an integer of 1 to 1000, and graft-bonded to the alkylene group in the main chain of the (meth)acrylate monomer, at least one fluorine-substituted hydrocarbon group having 1 to 30 carbon atoms and at least three fluorine atoms, per molecule of the (meth)acrylate monomer.

A second-type of polymer is a fluorine containing-crosslinked copolymer composed of (a) 10 to 99% by weight of units of a fluorine-containing difunctional (meth)acrylate ester monomer, and (b) 1 to 90% by weight of units of a trifunctional or higher fluorine-containing (meth)acrylate ester monomer, the units of the monomer (a) being units of a fluorine-containing difunctional (meth)acrylate ester monomer composed of a difunctional (meth)acrylate ester monomer represented by the following formula (III)

wherein $R^5$ represents a hydrogen atom or a methyl group, $R^6$ represents a hydrogen atom or a lower alkyl group, and k represents an integer of 1 to 20,000 on an average, and graft-bonded to the alkylene group of the main chain of the (meth)acrylate ester monomer, at least one fluorine-substituted hydrocarbon group containing 1 to 30 carbon atoms and at least three fluorine atoms, per molecule of said monomer, and the units of the monomer (b) being units of a trifunctional or higher poly(meth)acrylate of a polyoxyalkylene glycol having a branched structure, and graft-bonded to the carbon atom of the alkylene group in the main chain of said monomer, at least one fluorine-substituted hydrocarbon group containing 1 to 30 carbon atoms and at least three fluorine atoms, per molecule of said monomer.

These fluorine-containing polymers are very useful as an oxygen-permeable article, particularly a contact lens.

DETAILED DESCRIPTION OF THE INVENTION

First type of polymer

The first-type of polymer in this invention is a water-swellable gelled crosslinked polymer comprising as a main component a fluorine-containing (meth)acrylate ester polymer composed of a (meth)acrylate ester monomer represented by the following general formula (I) or (II)

(I)

(II)

and graft-bonded to the alkylene group in the main chain of the (meth)acrylate ester monomer, at least one specific fluorine-substituted hydrocarbon group per molecule of the above monomer.

This polymer may be a homopolymer of the fluorine-containing (meth)acrylate ester monomer, a copolymer of such (meth)acrylate ester monomers with each other, or a copolymer of it with another copolymerizable monomer.

In general formula (I) or (II) representing the (meth)acrylate ester monomer, $R^1$ to $R^3$ each represent a hydrogen atom or a methyl group, and $R^4$ represents a hydrocarbon group having 1 to 30 carbon atoms.

The group $R^4$ may contain not more than 61 oxygen or fluorine atoms. Specific examples of the hydrocarbon group are as follows:
—$CH_3$, —$C_2H_5$, —$C_4H_9$, —$C_6H_{12}$, —$C_{10}H_{21}$, —$C_{12}H_{25}$, —$C_{20}H_{41}$, —$CH(CH_3)_2$, $CF_2CFH(CF_2)_6H$, —$COCF_3$, —$COC_2F_5$, —$COCH(CF_3)_2$, —$COC_7F_{15}$, —$COC_{10}F_{21}$, and —$COCH_2CH_2C_6F_{13}$.

Among the above, —$CH_3$, —$C_2H_5$, —$COCF_3$, —$COC_2F_5$ and —$COC_7F_{15}$ are especially suitable as the hydrocarbon group $R^4$.

In general formula (I) or (II), m and n are 1 to 1,000, preferably 3 to 700, especially preferably 3 to 500.

Specific examples of the (meth)acrylate ester monomer of formula (I) are shown below.

$$CH_2=\overset{H}{\underset{|}{C}}CO_2\text{-}(CH_2CH_2O)_3CH_3,$$

$$CH_2=\overset{CH_3}{\underset{|}{C}}CO_2\text{-}(CH_2CH_2O)_3CH_3,$$

$$CH_2=\overset{H}{\underset{|}{C}}CO_2\text{-}(CH_2CH_2O)_9CH_3,$$

$$CH_2=\overset{CH_3}{\underset{|}{C}}CO_2\text{-}(CH_2CH_2O)_9CH_3,$$

$$CH_2=\overset{H}{\underset{|}{C}}CO_2\text{-}(CH_2CH_2O)_{14}CH_3,$$

$$CH_2=\overset{CH_3}{\underset{|}{C}}CO_2\text{-}(CH_2CH_2O)_{14}CH_3,$$

$$CH_2=\overset{H}{\underset{|}{C}}CO_2\text{-}(CH_2CH_2O)_{23}CH_3,$$

$$CH_2=\overset{CH_3}{\underset{|}{C}}CO_2\text{-}(CH_2CH_2O)_{23}CH_3,$$

$$CH_2=\overset{CH_3}{\underset{|}{C}}CO_2\text{-}(CH_2CH_2O)_3C\overset{O}{\underset{\|}{C}}C_7F_{15},$$

$$CH_2=\overset{CH_3}{\underset{|}{C}}CO_2\text{-}(CH_2CH_2O)_{23}C\overset{O}{\underset{\|}{C}}C_7F_{15},$$

$$CH_2=\overset{CH_3}{\underset{|}{C}}CO_2\text{-}(CHCH_2O)_9\overset{CH_3}{\underset{|}{C}}CH_3, \text{ and}$$

$$CH_2=\overset{CH_3}{\underset{|}{C}}CO_2\text{-}(CHCH_2O)_{23}\overset{CH_3}{\underset{|}{C}}CH_3.$$

They may be used either singly or in combination.

Specific examples of the (meth)acrylate ester monomer of general formula (II) are given below.

$$CH_2=\overset{H}{\underset{|}{C}}CO_2\text{-}(CH_2CH_2O)_{23}CO\text{-}\overset{H}{\underset{|}{C}}=CH_2,$$

$$CH_2=\overset{CH_3}{\underset{|}{C}}CO_2\text{-}(CH_2CH_2O)_{23}CO\text{-}\overset{CH_3}{\underset{|}{C}}=CH_2,$$

$$CH_2=\overset{H}{\underset{|}{C}}CO_2\text{-}(CH_2CH_2O)_{75}COC=CH_2,$$

$$CH_2=\overset{CH_3}{\underset{|}{C}}CO_2\text{-}(CH_2CH_2O)_{75}CO\overset{CH_3}{\underset{|}{C}}=CH_2,$$

$$CH_2=\overset{H}{\underset{|}{C}}CO_2\text{-}(CH_2CH_2O)_{170}COC=CH_2,$$

$$CH_2=\overset{CH_3}{\underset{|}{C}}CO_2\text{-}(CH_2CH_2O)_{170}CO\overset{CH_3}{\underset{|}{C}}=CH_2,$$

$$CH_2=\overset{H}{\underset{|}{C}}CO_2\text{-}(CHCH_2O)_{50}\overset{CH_3}{\underset{|}{C}}COC\overset{H}{\underset{|}{=}}CH_2, \text{ and}$$

$$CH_2=\overset{CH_3}{\underset{|}{C}}CO_2\text{-}(CHCH_2O)_{50}\overset{CH_3}{\underset{|}{C}}CO\overset{CH_3}{\underset{|}{C}}=CH_2.$$

They may be used singly or in combination.

The first-type of polymer provided by this invention comprises the aforesaid fluorine-containing (meth)acrylate ester monomer resulting from graft-bonding at least one fluorine-substituted hydrocarbon group per molecule of the monomer of formula (I) or (II) to the alkylene group in the main chain of the monomer of formula (I) or (II) as an essential constituent monomer.

At least three fluorine atoms are bonded to the fluorine-substituted hydrocarbon group, and the hydrocarbon contains 1 to 30 carbon atoms, preferably 1 to 20 carbon atoms.

Specific examples of the fluorine-substituted hydrocarbon group are as follows:

—CF$_2$CFHCF$_3$, —CF$_2$CFHC$_2$F$_5$, —CF$_2$CFHC$_4$F$_9$,
—CF$_2$CFHC$_6$F$_{13}$, —CF$_2$CFHC$_{10}$F$_{21}$,
—CF$_2$CFHCF$_2$H, —CF$_2$CFH(CF$_2$)$_2$H,
—CF$_2$CFH(CF$_2$)$_4$H, —CF$_2$CFH(CF$_2$)$_6$H,
—CF$_2$CFH(CF$_2$)$_7$H, —CF$_2$CFH(CF$_2$)$_8$H,
—CF$_2$CFH(CF$_2$)$_9$H, —CF$_2$CFH(CF$_2$)$_{10}$H,
—CH$_2$CH$_2$CF$_3$, —CF$_2$CH$_2$C$_2$F$_5$,
—CF$_2$CH$_2$(CF$_2$)$_6$H,
—CF$_2$CFHCF$_2$C(CF$_3$)$_3$, —CF$_2$CFHCF$_2$CH(C$_2$F$_5$)$_2$, and

Of these, fluorine-substituted alkyl groups having 2 to 20 carbon atoms are especially suitable, particularly those containing at least three fluorine atoms.

The fluorine-substituted hydrocarbon group is graft-bonded to the alkylene group of the oxyalkylene group in the main chain of the (meth)acrylate ester monomer of general formula (I) or (II). The proportion of the fluorine-substituted hydrocarbon groups is at least 1, preferably 1 to 20, per molecule of the monomer of formula (I) or (II). As a result, the resulting fluorine-containing (meth)acrylate ester monomer contains usually 3 to 400, preferably 3 to 200, fluorine atoms, per molecule of the fluorine-containing (meth)acrylate ester monomer.

Specific examples of the fluorine-containing (meth)acrylate ester include the following.

In the above formulae, m + n is 1 to 1000.

[ ‒(CH$_2$CH$_2$O)‒ and ‒(CH$_2$CHO)‒
                                        |
                                        CF$_2$CFHCF$_3$ shows random arrangement
and the same applies hereinafter.]

As previously stated, the first type of polymer may be a copolymer of the fluorine-containing (meth)acrylate ester monomer with another copolymerizable monomer. Specific examples of the other monomer include hydrocarbon-type methacrylates and acrylates such as hydroxyalkyl methacrylates and acrylates such as aminomethacrylates and aminoacrylates such as $$CH_2=\overset{CH_3}{\underset{|}{C}}COOCH_2CH_2N(CH_3)_2, \quad CH_2=\overset{CH_3}{\underset{|}{C}}COOCH_2CH_2N(C_2H_5)_2;$$

acrylamide and methacrylamide of the formulae $CH_2=CHCON(CH_3)_2$ and $CH_2=CHCON(C_2H_5)_2$; N-vinyllactams such as polyethylene glycol monomethacrylates and acrylates or polypropylene glycol monomethacrylates and acrylates such as polyethylene glycol dimethacrylates or acrylates and other difunctional methacrylates such as $$CH_2=\overset{CH_3}{\underset{|}{C}}-COO(CH_2CH_2O)_{14}CO-\overset{CH_3}{\underset{|}{C}}=CH_2,$$

and polyfunctional methacrylates such as

Preferred among these copolymerized monomer are polyethylene glycol (mono- or di-)methacrylate, and polypropylene glycol (mono- or di-)methacrylate.

The copolymer with the other copolymerizable monomer usually contains at least 20 mole %, preferably at least 40 mole %, and especially preferably 50 to 90 mole %, of the fluorine-containing (meth)acrylate ester monomer.

Second-type of polymer

The second-type of polymer is a fluorine-containing crosslinked copolymer composed essentially of (a) 10 to 99% by weight of units of a fluorine-containing difunctional (meth)acrylate ester monomer, and (b) 1 to 90% by weight of units of a trifunctional or higher fluorine-containing (meth)acrylate ester monomer.

The copolymer may contain a small amount of another units of another copolymerizable monomer so long as they contain the above monomer units (a) and (b) in the indicated amounts.

Monomer component (a)

The monomer component (a) is a fluorine-containing difunctional (meth)acrylate ester monomer resulting from graft-bonding of a specific fluorine-substituted hydrocarbon group to the carbon atom of the alkylene group in the main chain of a difunctional (meth)acrylate ester represented by the following general formula (III)

In general formula (III), $R^5$ represents a hydrogen atom or a methyl group, and $R^6$ represents a hydrogen atom, or a lower alkyl group having not more than 30 carbon atoms. A methyl group is preferred as the lower alkyl group.

In general formula (III), the average value of k is 1 to 20,000, preferably 3 to 15,000, especially preferably 9 to 10,000.

Specific examples of the (meth)acrylate ester monomer represented by general formula (III) are shown below.

They may be used either singly or in combination.

The fluorine-substituted hydrocarbon group graft-bonded to the alkylene group in the main chain of the difunctional (meth)acrylate monomer of general formula (III) is a hydrocarbon group having 1 to 30 carbon atoms, preferably 1 to 20 carbon atoms, to which at least three fluorine atoms are bonded. This fluorine-substituted hydrocarbon group may be the same as the fluorine-substituted hydrocarbon group to be graft-bonded to the alkylene group of the amine chain of the monomer of general formula (I) or (II) in the first-type polymer. Fluorine-substituted alkyl groups having 2 to 20 carbon atoms are preferably used.

The proportion of the fluorine-substituted hydrocarbon groups is at least 1, preferably 1 to 400, per molecule of the (meth)acrylate ester monomer of formula (III). As a result, the resulting fluorine-containing (meth)acrylate monomer contains usually 10,000, preferably 3 to 5,000, fluorine atoms per molecule of the fluorine-containing (meth)acrylate monomer.

Specific examples of the fluorine-containing difunctional (meth)acrylate monomer as component (a) are shown below.

(wherein m+n is an integer of 1 to 20,000).

They may be used either singly or in combination.

Monomer component (b)

The monomer component (b) to be used in combination with the monomer of component (a) is a monomer resulting from graft-bonding of a fluorine-substituted hydrocarbon group to the carbon atom of the oxyalkylene group in the main chain of a trifunctional or higher (meth)acrylate monomer composed of a poly(meth)acrylate of a polyoxyalkylene glycol having a branched structure.

The fluorine-substituted hydrocarbon group is a hydrocarbon group having 1 to 30 carbon atoms, especially 1 to 20 carbon atoms, to which at least three fluorine atoms are bonded, and may be the same as those described hereinabove with regard to the first-type polymer and the monomer of the component (a) of the second-type polymer.

The proportion of the fluorine-substituted hydrocarbon groups bonded is at least 1, preferably 1 to 400, per molecule of the (meth)acrylate ester monomer.

Specific examples of the trifunctional or higher poly(meth)acrylate of a polyoxyalkylene glycol having a branched structure are given below.

(wherein $R^1$ represents a hydrogen atom or a methyl group, $1+m$ represents an integer of 1 to 20,000, and n represents an integer of 1 to 20,000. $-(CH_2CH_2O)-$ and $-(CHCH_2O)-$ show a random arrangement; the same applies hereinafter.)

(wherein $l'+m'$ represents an integer of 1 to 20,000; the same applies hereinafter)

(wherein $R^2$ represents a hydrogen atom or a lower alkyl group; the same applies hereinafter)

show a random arrangement; the same applies hereinafter)

Mixtures of these may also be cited as examples.

Specific examples of the units of the trifunctional or higher fluorine-containing (meth)acrylate monomer as component (b) are given below.

(wherein $R^1$ represents a hydrogen atom or a methyl group, $1+1'+m$, and $n+n'$ each represent an integer of 1 to 20,000; $-(CH_2CH_2O)-$, and show a random arrangement; the same applies hereinafter.)

(wherein $R^2$ represents a hydrogen atom or a lower alkyl group)

(wherein $1+1'+m$, $n+n'+n''$, and $p+p'$ each represent an integer of 1 to 20,000).

Mixtures of these may also be cited as examples.

The second-type fluorine-containing copolymer may contain 10 to 99% by weight, preferably 15 to 95% by weight, especially preferably 30 to 90% by weight, of the units of the fluorine-containing difunctional (meth)acrylate ester monomer as component (a) and 1 to 90% by weight, preferably 5 to 85% by weight, especially preferably 10 to 70% by weight, of the units of the trifunctional or higher fluorine-containing (meth)acrylate ester monomer as component (b). If desired, the above copolymer may also containing units derived from another copolymerizable monomer component in an amount which does not impair the properties of the resulting polymer as an oxygen-permeable article, in addition to the above two essential components.

The other copolymerizable monomer may be the same as those exemplified hereinabove with regard to the first-type polymer.

In the present invention the monomer of the component (a) or (b) may be produced usually by graft-polymerizing a fluorine-substituted olefin corresponding to the fluorine-substituted hydrocarbon group with a polyoxyalkylene polyol such as polyethylene polyol to form a fluorine-containing polyoxyalkylene polyol, and reacting it with a large excess of a (meth)acryloyl chloride.

As shown in Referential Example 1 to be given hereinbelow, coupling reaction of the polyoxyalkylene polyol with itself occurs during the grafting of the fluorine-substituted olefin to form a trifunctional or higher polyoxyalkylene polyol in addition to a difunctional polyoxyalkylene glycol. Hence, the finally obtained fluorine-containing (meth)acrylate monomer contains both difunctional and a trifunctional or higher monomer. The content of the trifunctional or higher monomer may be properly adjusted by controlling the reaction conditions such as the amount of the initiator, and the reaction temperature in the grafting reaction.

Production of polymers

The first-type and second-type polymers in this invention may be obtained in a desired shape by polymerizing a mixture of the monomer components and a polymerization initiator in a mold. The mold may be of a shape conforming to the end use of the resulting fluorine-containing polymer. For example, when the final polymer is to be used as a contact lens, the polymerization is carried out in a mold conforming to the shape of a contact lens. For use as another oxygen-permeable article, the mold should conform to that particular use.

The polymerization initiator may be a radical polymerization initiator. Specific examples include radical initiators for thermal polymerization such as azobisisobutyronitrile, azobiscyclohexanecarbonitrile, phenylazobisbutyronitrile, azobisdimethylvaleronitrile, benzoyl peroxide, di-t-butyl peroxide and t-butyl hydroperoxide; and photopolymerization initiators such as benzoin ethers of the formula wherein R represents isopropyl or isobutyl; benzophenones such as benzophenone or benzoates; xanthones such as xanthone and thioxanthone, and a compound of the formula The temperature during the thermal polymerization is usually 40° to 200° C., preferably 45° to 120° C., and the time required for the polymerization is usually 0.5 to 5,000 minutes, preferably 30 to 2,000 minutes.

In the case of photopolymerization, the time required for the polymerization differs depending upon the types and amounts of the monomers and photopolymerization initiator and also upon the type of the light source. When, for example, is used, ultraviolet irradiation for several seconds to several minutes will give a polymer having sufficient strength for practical use.

In the present invention, the fluorine-containing monomer component resulting from graft-bonding of the fluorine-substituted hydrocarbon group to the (meth)acrylate monomer may be obtained by graft-polymerizing a fluorine-substituted olefin with the (meth)acrylate monomer. A perfluoroolefin such as perfluoroethylene that can be used as the fluorine-substituted olefin can be advantageously produced, for example, by reacting a perfluoroalkyl chloride corresponding to the perfluoroolefin with metallic zinc in the presence of an ether linkage-containing hydrocarbon solvent. In this method, a fluoroalkyl chloride of the following formula (IV)

wherein X represents a hydrogen or fluorine atom, and Rf represents a branched or linear perfluoroalkylene group, which is formed as a by-product, and discarded, in the conventional production of tetrafluoroethylene, can be advantageously used as a starting material. Examples of the fluoroalkyl chloride of formula (IV) are as follows:

The above method is carried out by reacting the fluoroalkyl chloride with metallic zinc in the ether linkage-containing hydrocarbon solvent at a temperature of 100° to 300° C., particularly 180° to 250° C. to form an organic fluorine-containing zinc compound of the following general formula wherein X and Rf are as defined and A represents a solvent molecule, separating the resulting compound from the reaction solution and thermally decomposing it to form a fluorine-containing olefin of the general formula $XRfCF=CF_2$.

Examples of suitable solvents containing an ether linkage are dioxane, tetrahydrofuran, ethylene glycol dimethyl ether and diethylene glycol dimethyl ether. Dioxane and tetrahydrofuran are especially suitable.

The resulting fluorine-containing olefin may be used in the above graft-polymerization.

Properties and uses of the polymers

The first-type and second-type polymers so obtained are hydrophilic gelled crosslinked polymer and have water swellability. The first-type polymer has a fluorine content of usually 0.01 to 70% by weight, preferably 1 to 50% by weight, and the second-type polymer has a fluorine content of usually 0.01 to 69% by weight, preferably 1 to 50% by weight.

These polymers have a water content of usually 30 to 90%, preferably 30 to 70%. The water content of the fluorine-containing crosslinked polymer is measured by the following method.

The sample polymer is put in a desiccator containing anhydrous calcium sulfate, and maintained at 37° C. It is taken out from the desiccator every 24 hours and weighed to one decimal place. When the weight change is within 0.5 mg for 24 hours, the sample is immersed in physiological saline at 37° C., and taken out by a forceps every 24 hours and wiped by a clean gauze for 30 seconds. It is shaken in air for 15 seconds and its weight (mg) is measured to decimal places. When the weight change is within 0.5 mg, the water content is calculated in accordance with the following equation.

$$\text{Water content (\%)} = \frac{\left(\begin{array}{c}\text{Weight of the}\\ \text{hydrous sample}\end{array}\right) - \left(\begin{array}{c}\text{Weight of the}\\ \text{dried sample}\end{array}\right)}{\text{Weight of the hydrous sample}} \times 100$$

The polymers of this invention have excellent oxygen permeability, and their oxygen permeability coefficient (DK value$\times 10^{-11}$ cc (STP) cm/cm$^2$.sec.mmHg) is usually 20 to 2,000, preferably 30 to 2,000, especially preferably 50 to 2,000. The oxygen permeability coefficient of the polymer is measured by using a film oxygen permeability tester of the Seikaken type. When the polymer is a hydrogel, a three-layer sample is prepared by holding the hydrogel between two TPX (poly-4-methyl-1-pentene) films each having a known thickness of 50 microns in order to remove the effect of a KCl solution in the electrode portion. The oxygen permeability coefficient of the hydrogel is calculated in accordance with the following equation.

$$\frac{L}{DK} = \frac{L_1}{DK_1} + \frac{L_2}{DK_2} + \frac{L_3}{DK_3}$$

where

DK: the oxygen permeability coefficient of the three-layer sample, $DK_1$ and $DK_3$: the oxygen permeability coefficient of the TPX films, $DK_2$: the oxygen permeability coefficient of the hydrogel, $L = L_1 + L_2 + L_3$ $L_1$ and $L_3$: the thickness of the TPX films $L_2$: the thickness of the hydrogel.

The contamination resistance of the polymer is determined by contaminating a hydrous lens made of the polymer with a standard protein (albumin), extracting the protein and evaluating the contamination resistance by the amount of the extracted protein. Specifically, the hydrous lens having a diameter of 1.7 cm and a thickness of 200 microns is immersed for 4 hours in a 0.5% aqueous solution of albumin, and the amount of the albumin in the lens is measured by the method of Okamura and Iwata (J.Jpn. Cont. Lens Soc., 23, 10–14 (1981).

The fluorine-containing polymers provided by this invention have excellent resistance to contamination by components of tear such as proteins, lipids and mucin and also show excellent hydrophilicity, water swellability, wearing comfort and oxygen permeability. They also have excellent bio-compatibility. Accordingly, they are useful as oxygen-permeable articles for the living body, such as soft contact lenses and various types of separation membranes. Soft contact lenses made from the polymers of this invention have the advantage of permitting long-term wearing because of their excellent oxygen permeability, hydrophilicity, water swellability, resistance to contamination by tear components, wearing comfort and bio-compatibility over conventional contact lenses.

The following examples illustrate the present invention more specifically. Examples 1 to 11 cover the first-type polymer, and Examples 12 to 17, the second-type polymer.

EXAMPLE 1

Polyethylene glycol having a molecular weight of 6,000 was dissolved in benzene, and perfluoropropylene (PFP for short hereinafter) was grafted to it under pressure using benzoyl peroxide as an initiator to obtain fluorine-containing polyethylene glycol. This compound was dissolved in chloroform, and reacted with a large excess of methacryloyl chloride using pyridine as a catalyst to give fluorine-containing polyethylene glycol dimethacrylate (F-containing PEGDM for short). It had a fluorine content of 16% by weight determined by elemental analysis and an average molecular weight of 6500 determined by GPC (calculated for polystyrene).

One hundred parts of the F-containing PEG was mixed fully with 0.5 part of azobisisobutyronitrile with stirring at 50° C. for 1 to 5 minutes, and the mixture was deaerated in vacuum at 50° C. for 10 minutes. The resulting solution was maintained at 50° C. and poured into a space between two glass sheets with a 200-micron Teflon packing used as a spacer in an atmosphere of nitrogen. The glass sheets were fixed by a fastening device and the entire assembly was put in an electrical furnace. The solution was heated at 60° C. for 24 hours and at 70°, 80° and 90° C. each for 2 hours to polymerize the monomer.

After the polymerization, the resulting film was peeled from the glass sheets and immersed in physiological saline to give a transparent hydrogel film. Its oxygen permeability coefficient and water content were measured, and the results are shown in Table 1.

EXAMPLES 2–5

In the same way as in Example 1, F-containing PEGDM monomers were prepared from starting materials resulting from grafting a fluorine-containing olefin to polyethylene glycols having different average molecular weights. These monomers were each polymerized in the same way as in Example 1 to give hydrogel films. The results of measurements are shown in Table 1.

EXAMPLE 6

In the same way as in Example 1, one molecule of PFP was grafted to triethylene glycol monomethyl ether to synthesize fluorine-containing triethylene glycol monomethyl ether monomethacrylate (F-containing TEGMM for short). Fifty parts of this compound was mixed with 50 parts of the F-containing PEGDM synthesized in Example 2 to form a solution which was viscous at room temperature. To 100 parts of the solution was added 0.5 part of azobisisobutyronitrile. They were fully mixed with stirring, and deaerated at room temperature. The mixture was then subjected to the same operation as in Example 1 at room temperature to give a hydrogel film. The film retained high oxygen permeability in spite of its lower water content than in Example 2. The results are shown in Table 2.

EXAMPLE 7

Example 6 was repeated except that in the synthesis of F-containing TEGMM, 2 molecules of 8-monohydroperfluoro-1-octene [$CF_2=CF(CF_2)_6H$] was used instead of PFP. The results are shown in Table 2.

EXAMPLE 8

Fifty parts of the F-containing TEGMM synthesized in Example 6 was mixed with 50 parts of polyethylene glycol dimethacrylate having an average molecular weight of 6,000 and being free from a fluorine functional group, and a hydrogel film containing 9% of fluorine was prepared from the resulting mixture by the same operation as in Example 6. The film had a water content of 33% and an oxygen permeability coefficient of $32 \times 10^{-11}$ ml (STP) cm/cm$^2$.sec.mmHg.

EXAMPLES 9–11

A solution was prepared by mixing the F-containing PEGDM as used in Example 4 (the hydrogel film from it had an oxygen permeability coefficient of $33 \times 10^{-11}$ ml (STP) cm/cm$^2$.sec.mmHg), N-vinylpyrrolidone (NVP for short), hexafluoroisopropyl methacrylate (HFIM for short) and 2-hydroxyethyl methacrylate (HEMA for short) each in an amount of 50 parts. A hydrogel film was prepared from the solution by the same operation as in Example 6. Its water content and oxygen permeability coefficient were measured, and the results are shown in Table 3.

COMPARATIVE EXAMPLE 1

One hundred parts of HEMA and 5 parts of diethylene glycol dimethacrylate (2G for short) as a crosslinking agent were mixed to form a solution. A hydrogel film was prepared from the resulting solution by the same operation as in Example 6. The water content and oxygen permeability coefficient of the hydrogel film were measured, and the results are shown in Table 4.

COMPARATIVE EXAMPLE 2

A solution was prepared by mixing 70 parts of NVP, 30 parts of m ethyl methacrylate (MMA for short) and 5 parts of 2G. A hydrogel film was prepared from the solution by the same operation as in Example 6. The water content and oxygen permeability of the hydrogel film were measured, and the results are shown in Table 4.

TABLE 2

Results with hydrogels by copolymerization of F-containing TEGMM and F-containing PEGDM

|  | Example 6 | Example 7 |
|---|---|---|
| Grafing functional group of F-containing TEGMM | —$CF_2CFHCF_3$ | —$CF_2CFH(CF_2)_6H$ |
| Number of functional groups of F-containing TEGMM | 1.0 | 2.0 |
| Monomer ratio (weight) F-containing PEGDM of Example 1 to F-containing TEGMM | 50/50 | 50/50 |
| F content (wt %) | 18 | 37 |
| Water content (%) | 35 | 37 |
| Oxygen permeability coefficient ($\times 10^{-11}$ m (STP)cm/cm$^2$sec mmHg) | 57 | 51 |

TABLE 3

Results with hydrogels by copolymerization of F-containing PEGDM and monofunctional monomer

|  | Example 9 | Example 10 | Example 11 |
|---|---|---|---|
| Type of the monofunctional monomer | NVP | HFIM | HEMA |
| Monomer ratio (weight) F-conating PEGDM of Example 4 to monofunctional monomer | 50/50 | 50/50 | 50/50 |
| F content (wt %) | 6.5 | 30.5 | 6.5 |
| Water content (%) | 60 | 38 | 47 |
| Oxygen permeability coefficient ($\times 10^{-11}$ ml(STP)cm/cm$^2$ sec mmHg) | 33 | 34 | 27 |

TABLE 4

Results with conventional hydrogels

|  |  | Comparative Example 1 | Comparative Example 2 |
|---|---|---|---|
| Monomer used | 1 | HEMA | NVP |
|  | 2 | 2G | MMA |
|  | 3 | — | 2G |

TABLE 1

Results with hydrogels from F-containing PEGDM

|  | Example 1 | Example 2 | Example 3 | Example 4 | Example 5 |
|---|---|---|---|---|---|
| Average molecular weight (GPC, calculated for polystyrene) | 6500 | 15000 | 7800 | 7300 | 7100 |
| Type of the grafting functional group | —$CF_2CFHCF_3$ | —$CF_2CFHCF_3$ | —$CF_2CFH(CF_2)_6H$ | —$CF_2CFH(CF_2)_6H$ | —$CF_2CFH(CF_2)_6H$ |
| F content (wt %) | 11 | 16 | 13 | 8 | 28 |
| Water content (%) | 62 | 63 | 56 | 57 | 43 |
| Oxygen permeability coefficient ($\times 10^{-11}$ m (STP) cm/cm$^2$ sec mmHg) | 43 | 54 | 33 | 32 | 30 |

TABLE 4-continued

Results with conventional hydrogels

| | Comparative Example 1 | Comparative Example 2 |
|---|---|---|
| Monomer ratio (weight) 1 / 2 / 3 | 100/5 | 70/30/5 |
| Water content (%) | 38 | 68 |
| Oxygen permeability coefficient ($\times 10^{-11}$ ml(STP)cm/cm$^2$ sec mmHg) | 8 | 20 |

2G: $CH_2=CCO(CH_2CH_2O)_2CC=CH_2$ with $CH_3$ groups and $O$

MMA: $CH_2=CCOCH_3$ with $CH_3$ and $O$

REFERENTIAL EXAMPLE 1

This example illustrates the preparation of a monomer for producing a fluorine-containing copolymer of the second type.

A polyoxyalkylene glycol such as polyethylene glycol was dissolved in a solvent such as chlorobenzene, and benzoyl peroxide was added as an initiator. Under pressure, a fluorine-containing reactive monomer such as hexafluoropropylene (HFP for short) was grafted to the polyalkylene glycol to give fluorine-containing polyoxyalkylene glycol. The resulting compound was dissolved in chloroform, and reacted with a large excess of methacryloyl chloride using pyridine as a catalyst to produce a fluorine-containing polyoxyalkylene glycol polymethacrylate for the preparation of fluorine-containing crosslinked copolymers of the invention.

The resulting monomer was analyzed, and the results are described below.

Figure 1A:
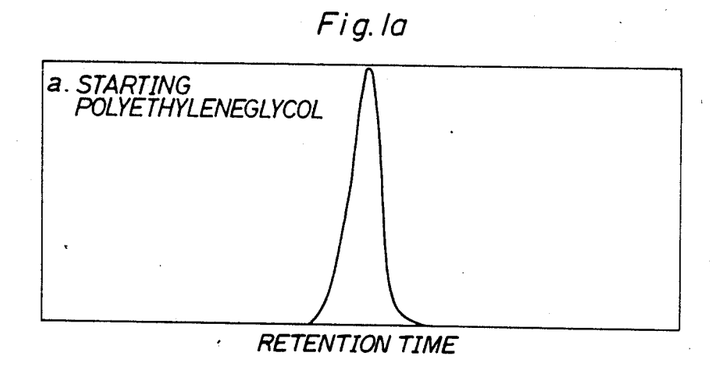
FIG. 1a shows the gel permeation chromatography (GPC) pattern of polyethylene glycol used as a starting material in Referential Example 1.
Figure 1B:
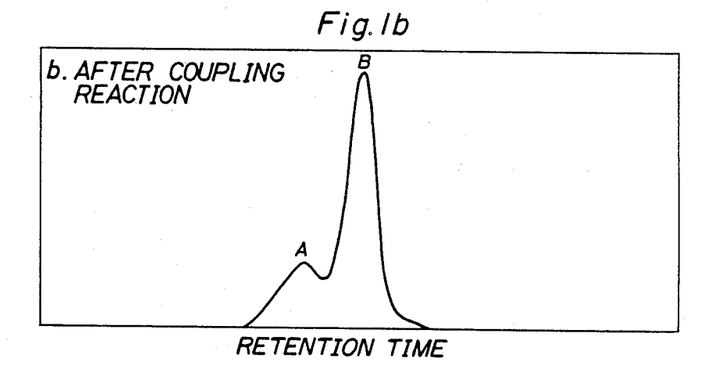
FIG. 1b is the gel permeation chromatograph pattern of a grafted mixture of trifunctional or higher polyethylene glycol obtained by graft-reacting the above polyethylene glycol with hexafluoropropylene and the starting difunctional polyethylene glycol.
Figure 1C:
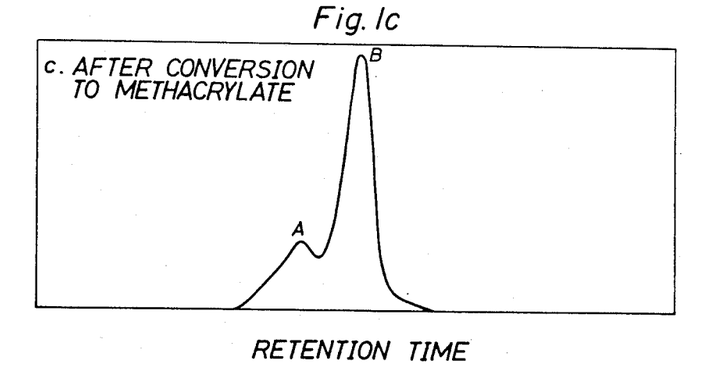
FIG. 1c shows the GPC pattern of the methacrylate of the above polyethylene glycol grafted mixture (a mixture of polyfunctional polyethylene glycol polymethacrylate and difunctional polyethylene glycol dimethacrylate).

FIG. 1 shows the GPC patterns of various compounds in the preparation of fluorine-containing polyethylene glycol polymethacrylate from the starting material polyethylene glycol having an average molecular weight of 6,000 determined by GPC and calculated for polystyrene by the above method.

FIG. Ia shows the GPC pattern of the starting polyethylene glycol. FIG. Ib shows the GPC pattern of the HFP-grafted polyethylene glycol. FIG. Ic shows the GPC pattern of the methacrylate of the HFP-grafted polyethylene glycol. In the GPC pattern Ib, a new peak A appeared on the higher molecular weight side. This peak remained unchanged after conversion to the methacrylate (Ic). The polymer assigned to the peak A was separated by a GPC column, and analyzed by proton NMR and $^{13}C$—NMR. It was found that a linkage of the formula

—O—CHCH$_2$O—
|
O
|
CH$_2$CH$_2$— formed. Thus, it was determined that during the grafting reaction, coupling reaction of polyethylene glycol with itself took place to form trifunctional or higher polyethylene glycol. From the ratio of the areas of peaks A and B and the average molecular weights, the weight ratio of the F-containing PEGDM to the F-containing PEGPM was found to be 50:50. The amount of the trifunctional or higher polyethylene glycol can be adjusted by controlling the graft reaction conditions such as the amount of the initiator and the reaction temperature.

EXAMPLE 12

A monomeric mixture consisting of 50% by weight of F-containing PEGDM and 50% by weight of F-containing PEGPM was prepared from polyethylene glycol having an average molecular weight of 15,000 and HFP in accordance with the method shown in Referential Example 1. The monomeric mixture had an average molecular weight of 21,400 (calculated for polystyrene).

To 100 parts of the monomeric mixture was added 0.5 part of azobisisobutyronitrile and they were fully mixed with stirring at 50° C. for 1 to 5 minutes. The mixture was deaerated under vacuum at 50° C. for 10 minutes. The resulting solution was maintained at 50° C., and poured into a space between two polyester films with a 200-micron aluminum plate used as a spacer in an atmosphere of nitrogen. The polyester films were fixed by a fastening device, and the entire assembly was put in a constant temperature vessel, and heated at 60° C. for 24 hours and then at 70°, 80° and 90° C. each for 2 hours to polymerize the monomeric mixture.

After the polymerization, the resulting film was peeled from the polyester films, and immersed in physiological saline to give a transparent hydrogel film. Its oxygen permeability coefficient and water content, and the amount of albumin adhering to it were measured. The amount of albumin adhering to the film is given by a relative amount when the amount (%) of albumin adhering to hydrous 2-hydroxyethylmethacrylate (PHEMA) is taken as 100 (%). The results are shown in Table 5.

EXAMPLES 13–16

Various fluorine-containing polyethylene glycol polymethacrylates were synthesized by using polyethylene glycols having different average molecular weights and fluorine-containing grafting substituents of different structures in accordance with the method shown in Referential Example 1. Hydrogel films were prepared from the resulting polymethacrylates by the same method as in Example 12. The results are shown in Table 5.

EXAMPLE 17

Seventy parts of the fluorine-containing polyethylene glycol polymethacrylate, 30 parts of 2,2,3,4,4,4-hexafluorobutylmethacrylate (HFBM for short) of the formula $CH_2=CCOCH_2CF_2CFHCF_3$ with $CH_3$ and $O$ and 0.5 part of azobisisobutyronitrile were fully mixed with stirring, and deaerated under vacuum at 40° C. for 10 minutes. The resulting solution was poured into a space between two polyester films with a 200-micron aluminum plate used as a spacer in an atmosphere of nitrogen. The films were fixed by a fastening device and the entire assembly was placed in a constant temperature vessel and heated at 60° C. for 24 hours and then at 70°, 80° and 90° C. each for 2 hours to polymerize the monomers.

After the polymerization, the resulting film was peeled from the polyester films, and immersed in physiological saline to give a transparent hydrogel film. Its oxygen permeability coefficient and water content and the amount of albumin adhesion were measured. The results are shown in Table 6.

EXAMPLE 18

A hydrogel film was prepared in the same way as in Example 17 except that the amount of the fluorine-containing polyethylene glycol polymethacrylate was changed to 50 parts, and the amount of HFBM was changed to 50 parts. The results are shown in Table 6.

EXAMPLES 19-21

A hydrogel film was prepared in the same way as in Example 17 except that the mixing ratio of the same fluorine-containing polyethylene glycol polymethacrylate used in Example 12 to (TFEM for short) or HEMA was changed as indicated in Table 6. The results are shown in Table 6.

COMPARATIVE EXAMPLE 3

Polyethylene glycol having an average molecular weight of 15,000 was dissolved in chloroform, and reacted with a large excess of methacryloyl chloride using pyridine as a catalyst to form (PEGDM having an average molecular weight of 15,200 (determined by GPC and calculated for polystyrene). The resulting PEGDM was polymerized by the same operation as in Example 12. But the melt viscosity of the polymerization mixture was excessively high, and a film permitting the measurement of oxygen permeability coefficient was not obtained.

COMPARATIVE EXAMPLE 4

PEGDM having an average molecular weight of 6,100 (GPC, calculated for polystyrene) was synthesized as in Comparative Example 4. A hydrogel was prepared by the same operation as in Example 1. The results are shown in Table 7.

COMPARATIVE EXAMPLE 5

A hydrogel film was prepared by the same operation as in Example 17 using a solution prepared by mixing 100 parts of HEMA and 5 parts of 2G as a crosslinking agent. The water content, oxygen permeability coefficient and amount of albumin adhesion of the film were measured. The results are shown in Table 7.

COMPARATIVE EXAMPLE 6

A hydrogel film was produced in the same way as in Example 17 using a solution prepared by mixing 70 parts of NVP, 30 parts of MMA and 5 parts of 2G. The water content, oxygen permeability coefficient and amount of albumin adhesion of the film were measured, and the results are shown in Table 7.

TABLE 5

|  | Example 12 | Example 13 | Example 14 | Example 15 | Example 16 |
| --- | --- | --- | --- | --- | --- |
| Monomer ratio (weight) F-containing PEGDM/F-containing PEGPM | 50/50 | 70/30 | 60/40 | 65/35 | 70/30 |
| Average molecular weight of the monomer (GPC, calculated for polystyrene) | 21400 | 14900 | 7820 | 7200 | 7500 |
| Grafting functional group | —$CF_2CFHCF_3$ | —$CF_2CFHCF_3$ | —$CF_2CFH(CF_2)_6H$ | —$CF_2CFH(CF_2)_6H$ | —$CF_2CFHCF_3$ |
| F content (wt %) | 24 | 18 | 13 | 28 | 11 |
| Water content (%) | 49 | 63 | 56 | 43 | 51 |
| Oxygen permeability coefficient ($\times 10^{-11}$ cc(STP) cm/cm$^2 \cdot$ sec $\cdot$ mmHg) | 67 | 54 | 33 | 30 | 35 |
| Amount of albumin adhesion (%) relative to PHEMA of Comparative Example 5 | 29 | 26 | 44 | 25 | 36 |

TABLE 6

Results with hydrogels by copolymerization of F-containing PEGPM and other monofunctional monomer

|  | Example 17 | Example 18 | Example 19 | Example 20 | Example 21 |
| --- | --- | --- | --- | --- | --- |
| Type of the monofunctional monomer | HFBM | HFBM | TFEM | TFEM | HEMA |
| Monomer ratio (weight) F-containing PEGPM of Example 12 to the monofunctional monomer | 70/30 | 50/50 | 70/30 | 50/50 | 70/30 |
| F content (wt %) | 30 | 35 | 27 | 29 | 17 |
| Water content (%) | 45 | 35 | 47 | 36 | 52 |
| Oxygen permeability coefficient ($\times 10^{-11}$ cc(STP)cm/cm$^2 \cdot$ sec $\cdot$ mmHg) | 45 | 32 | 40 | 22 | 33 |
| Amount of albumin adhesion (%) relative to PHEMA of Comparative | 23 | 15 | 24 | 22 | 41 |

TABLE 6-continued

Results with hydrogels by copolymerization of F-containing PEGPM and other monofunctional monomer

| | Example 17 | Example 18 | Example 19 | Example 20 | Example 21 |
|---|---|---|---|---|---|

Example 5

HFBM; $CH_2=\overset{CH_3}{\underset{}{C}}COCH_2CF_2CFHCF_3$

TFEM; $CH_2=\overset{CH_3}{\underset{}{C}}COCH_2CF_3$

HEMA; $CH_2=\overset{CH_3}{\underset{}{C}}COCH_2CH_2OH$

TABLE 7

| | Comparative Example 3 | Comparative Example 4 | Comparative Example 5 | Comparative Example 6 |
|---|---|---|---|---|
| Monomer (A) (Molecular weight; GPC, calculated for polystyrene) | PEGDM (15200) | PEGDM (6100) | HEMA | NVP |
| Monomer (B) | — | — | 2G | MMA |
| Monomer (C) | — | — | — | 2G |
| Monomer ratio (weight) (A)/(B)/(C) | 100/0/0 | 100/0/0 | 100/5/0 | 70/30/5 |
| F content (wt %) | 0 | 0 | 0 | 0 |
| Water content (%) | 70 | 65 | 38 | 68 |
| Oxygen permeability coefficient ($\times 10^{-11}$ cc(STP)cm/cm$^2$ · sec · mmHg) | Defoaming impossible | 32 | 8 | 20 |
| Amount of albumin adhesion (%) relative to PHEMA of Comparative Example 5 | — | 160 | 100 | 149 |

PEGDM; $CH_2=\overset{CH_3}{\underset{}{C}}CO(CH_2CH_2O)_{\overline{n}}\overset{CH_3}{\underset{}{C}}C=CH_2$

NVP;

MMA; $CH_2=\overset{CH_3}{\underset{}{C}}COCH_3$

2G; $CH_2=\overset{CH_3}{\underset{}{C}}CO(CH_2CH_2O)_{\overline{2}}\overset{CH_3}{\underset{}{C}}C=CH_2$

What is claimed is:

1. A fluorine-containing, hydrophilic, oxygen permeable, gelled, crosslinked polymer having water swellability comprising as an essential monomer component a fluorine-containing (meth)acrylate monomer composed of a (meth)acrylate ester monomer represented by the following general formula (I)

$$CH_2=\overset{R^1}{\underset{}{C}}-CO_2-(\overset{R^2}{\underset{}{C}}H\overset{R^3}{\underset{}{C}}HO)_{\overline{m}}R_4 \quad (I)$$

or the following general formula (II)

$$CH_2=\overset{R^1}{\underset{}{C}}-CO_2-(\overset{R^2}{\underset{}{C}}HCH_2O)_{\overline{n}}CO-\overset{R^1}{\underset{}{C}}=CH_2 \quad (II)$$

wherein $R^1$, $R^2$ and $R^3$ each represent a hydrogen atom or a methyl group, $R^4$ represents a hydrocarbon group having 1 to 30 carbon atoms or a hydrocarbon group having 1 to 30 carbon atoms which contains not more than 61 oxygen or fluorine atoms, and m and n each represent an integer of 1 to 1,000, and graft-bonded to the alkylene group in the main chain of the (meth)acrylate monomer, at least one fluorine-substituted hydrocarbon group having 1 to 30 carbon atoms and at least three fluorine atoms, per molecule of the (meth)acrylate monomer.

2. The fluorine-containing polymer of claim 1 wherein in the (meth)acrylate ester monomer of general formula (I), m is an integer of 3–50.

3. The fluorine-containing polymer of claim 1 wherein in the (meth)acrylate ester monomer of formula (II), n is an integer of 20–800.

4. The fluorine-containing polymer of claim 1, 2 or 3 wherein the graft-bonded fluorine-substituted hydrocarbon group is selected from the class consisting of
—CF$_2$CFHCF$_3$, —CF$_2$CFHC$_2$F$_5$, —CF$_2$CFHC$_4$F$_9$,
—CF$_2$CFHC$_6$F$_{13}$, —CF$_2$CFHC$_{10}$F$_{21}$,
—CF$_2$CFHCF$_2$H, —CF$_2$CFH(CF$_2$)$_2$H,
—CF$_2$CFH(CF$_2$)$_4$H, —CF$_2$CFH(CF$_2$)$_6$H,
—CF$_2$CFH(CF$_2$)$_7$H, —CF$_2$CFH(CF$_2$)$_8$H,
—CF$_2$CFH(CF$_2$)$_9$H, —CF$_2$CFH(CF$_2$)$_{10}$H,
—CH$_2$CH$_2$CF$_3$, —CH$_2$CH$_2$C$_2$F$_5$,
—CH$_2$CH$_2$(CF$_2$)$_6$H,
—CF$_2$CFHCF$_2$C(CF$_3$)$_3$, —CF$_2$CFHCF$_2$CH(C$_2$F$_5$)$_2$, 5. A hydrophilic, oxygen permeable, gelled crosslinked fluorine-containing polymer having a water swellability, which comprises a polymerized (meth)acrylate ester monomer having the following formula:

wherein R$^1$ and R$^2$ represents a hydrogen atom or a methyl group, and n is an integer of from 1 to 2000, and graft-bonded to the alkylene group in the main chain of the (meth)acrylate ester monomer at least one fluorine-substituted hydrocarbon group having 1 to 30 carbon atoms and at least three fluorine atoms per molecule of the (meth)acrylate ester monomer.

6. The fluorine-containing polymer of claim 5, wherein said polymer is a homopolymer of the (meth)acrylate ester monomer having the formula (II).

7. The fluorine-containing polymer of claim 5, wherein said polymer is a copolymer of the (meth)acrylate ester monomer having the formula (II) with at least one comonomer other than said (meth)acrylic diester.

8. The fluorine-containing polymer of claim 7, wherein said copolymer contains at least 20 mole % of the (meth)acrylate ester monomer.

9. The fluorine-containing polymer of claim 5, wherein said polymer is a copolymer of the (meth)acrylate ester monomer having the formula (II) and a (meth)acrylate ester monomer having the following formula:

wherein R$^1$, R$^2$ and R$^3$ represent a hydrogen atom or a methyl group, R$^4$ represents a hydrocarbon group having 1 to 30 carbon atoms which contains not more than 61 oxygen or fluorine atoms, and m is an integer of from 1 to 1000, and graft-bonded to the alkylene groups in the main chains of the (meth)acrylate ester monomers at least one fluorine-substituted hydrocarbon group having 1 to 30 carbon atoms and at least three fluorine atoms per molecule of the (meth)acrylate ester monomers.

10. The fluorine-containing polymer of claim 5, wherein said polymer is a copolymer comprising (a) 10 to 99% by weight of the (meth)acrylate ester monomer having the formula (II) and (b) 1 to 90% by weight of a trifunctional or higher fluorine-containing (meth)acrylate ester monomer, said fluorine-containing (meth)acrylate ester monomer being obtained by reaction of a polyoxyalkylene glycol having a branched structure and having at least one fluorine-substituted hydrocarbon group containing 1 to 30 carbon atoms and at least three fluorine atoms per molecule of the (meth)acrylate ester monomer graft-bonded to the alkylene group in the main chain of the (meth)acrylate ester monomer, and a (meth)acryloyl acid chloride.

11. A fluorine-containing, hydrophilic, oxygen permeable gelled, crosslinked copolymer having water swellability composed essentially of
(a) 10 to 99% by weight of units of a fluorine-containing difunctional (meth)acrylate ester monomer, and (b) 1 to 90% by weight of units of a trifunctional or higher fluorine-containing (meth)acrylate ester monomer,
the units of the monomer (a) being units of a fluorine-containing difunctional (meth)acrylate ester monomer composed of a difunctional (meth)acrylate ester monomer represented by the following general formula (III)

wherein R$^5$ represents a hydrogen atom or a methyl group, R$^6$ represents a hydrogen atom or a lower alkyl group, and k represents an integer of 1 to 20,000 on an average,
and graft-bonded to the alkylene group in the main chain of the (meth)acrylate ester monomer, at least one fluorine-substituted hydrocarbon group containing 1 to 30 carbon atoms and at least three fluorine atoms, per molecule of said monomer, and the units of the monomer (b) being a trifunctional or higher fluorine-containing (meth)acrylate ester monomer composed of a trifunctional or higher poly(meth)acrylate of a polyoxyalkylene glycol having a branched structure, and graft-bonded to the carbon atom of the alkylene group in the main chain of said monomer at least one fluorine-substituted hydrocarbon group containing 1 to 30 carbon atoms and at least three fluorine atoms, per molecule of said monomer.

12. A fluorine-containing, hydrophilic, oxygen permeable, gelled, crosslinked polymer having water swellability comprising as an essential monomer component a fluorine-containing (meth)acrylate monomer composed of
(A) a (meth)acrylate ester monomer represented by the following general formula (I)

wherein $R^1$, $R^2$ and $R^3$ each represent a hydrogen atom or a methyl group, $R^4$ represents a hydrocarbon group having 1 to 30 carbon atoms or a hydrocarbon group having 1 to 30 carbon atoms which contains not more than 61 oxygen or fluorine atoms, and m represents an integer of 1 to 1,000, and graft-bonded to the alkylene group in the main chain of the (meth)acrylate monomer, at least one fluorine-substituted hydrocarbon group having 1 to 30 carbon atoms and at least three fluorine atoms, per molecule of the (meth)acrylate monomer;

(B) a (meth)acrylate ester monomer represented by the following general formula (II)

wherein $R^1$ and $R^2$ each represent a hydrogen atom or a methyl group, and n represents an integer of 1 to 1,000,
and graft-bonded to the alkylene group in the main chain of the (meth)acrylate monomer, at least one fluorine-substituted hydrocarbon group having 1 to 30 carbon atoms and at least three fluorine atoms, per molecule of the (meth)acrylate monomer; or (C) a mixture of (a) 10 to 99% by weight of units of a fluorine-containing difunctional (meth)acrylate ester monomer, and (b) 1 to 90% by weight of units of a trifunctional or higher fluorine-containing (meth)acrylate ester monomer, the units of the monomer (a) being units of a fluorine-containing difunctional (meth)acrylate ester monomer composed of a difunctional (meth)acrylate ester monomer represented by the following general formula (III)

wherein $R^5$ represents a hydrogen atom or a methyl group, $R^6$ represents a hydrogen atom or a lower alkyl group, and k represents an integer of 1 to 20,000 on an average,
and graft-bonded to the alkylene group in the main chain of the (meth)acrylate ester monomer, at least one fluorine-substituted hydrocarbon group containing 1 to 30 carbon atoms and at least three fluorine atoms, per molecule of said monomer, and the units of the monomer (b) being a trifunctional or higher fluorine-containing (meth)acrylate ester monomer composed of a trifunctional or higher poly(meth)acrylate of a polyoxyalkylene glycol having a branched structure, and graft-bonded to the alkylene group in the main chain of said monomer at least one fluorine-substituted hydrocarbon group containing 1 to 30 carbon atoms and at least three fluorine atoms, per molecule of said monomer.

* * * * *

UNITED STATES PATENT AND TRADEMARK OFFICE
CERTIFICATE OF CORRECTION

PATENT NO. : 4,957,985
DATED     : September 18, 1990
INVENTOR(S) : TOKINORI AGOU, ET AL.

It is certified that error appears in the above-identified patent and that said Letters Patent is hereby corrected as shown below:

On the title page:
At [30] Foreign Application Priority Data, "December 29, 1987 [JP]" should read --December 29, 1986 [JP]--.

Signed and Sealed this

First Day of February, 1994

Attest:

BRUCE LEHMAN

*Attesting Officer*        *Commissioner of Patents and Trademarks*